United States Patent [19]

Shimizu et al.

[11] Patent Number: 5,377,107
[45] Date of Patent: Dec. 27, 1994

[54] SYSTEM AND METHOD FOR CONTROLLING DAMPING FORCE CHARACTERISTIC OF SHOCK ABSORBER APPLICABLE TO AUTOMOTIVE SUSPENSION

[75] Inventors: Hiroyuki Shimizu; Shinobu Kakizaki; Kimihisa Kasajima, all of Kanagawa, Japan

[73] Assignee: Atsugi Unisia Corporation, Japan

[21] Appl. No.: 798,887

[22] Filed: Nov. 27, 1991

[30] Foreign Application Priority Data

Nov. 30, 1990 [JP] Japan ................ 2-130662[U]

[51] Int. Cl.$^5$ ............................................ B60G 17/00
[52] U.S. Cl. ........................ 364/424.05; 364/424.01; 280/707; 280/703; 280/708
[58] Field of Search ............... 364/424.05, 424.01; 280/707, 840, 772, 703, 724, 702, 708

[56] References Cited

U.S. PATENT DOCUMENTS

| | | | |
|---|---|---|---|
| 4,696,489 | 9/1987 | Fujishiro et al. | 280/707 |
| 4,761,022 | 8/1988 | Ohashi et al. | 280/772 |
| 4,961,483 | 10/1990 | Yamaoka et al. | 188/299 |
| 5,072,965 | 12/1991 | Wada et al. | 280/707 |
| 5,103,396 | 4/1992 | Hiwatashi et al. | 364/424.05 |
| 5,142,415 | 8/1992 | Matsunaga et al. | 364/424.05 |
| 5,142,477 | 8/1992 | Tsutsumi et al. | 364/424.05 |
| 5,144,559 | 9/1992 | Kamimura et al. | 364/424.05 |
| 5,175,687 | 12/1992 | Tsutsumi et al. | 364/424.05 |

FOREIGN PATENT DOCUMENTS

| | | |
|---|---|---|
| 0139145 | 5/1985 | European Pat. Off. . |
| 0184915 | 6/1986 | European Pat. Off. . |
| 0262572 | 4/1988 | European Pat. Off. . |
| 0265670 | 5/1988 | European Pat. Off. . |
| 3827737 | 3/1989 | Germany . |
| 60-47612 | 4/1985 | Japan . |
| 61-163010 | 7/1986 | Japan . |
| 61-163011 | 7/1986 | Japan . |
| 63-6238 | 1/1988 | Japan . |
| 64-60411 | 3/1989 | Japan . |
| 3-84237 | 4/1991 | Japan . |

OTHER PUBLICATIONS

U.S. Patent Application Ser. No. 07/682,593, filed Apr. 8, 1991, entitled "Damping Force Controller".

Primary Examiner—Thoams G. Black
Assistant Examiner—Jacques H. Louis-Jacques
Attorney, Agent, or Firm—Ronald P. Kananen

[57] ABSTRACT

A system and method for controlling a damper of vehicular suspension in which when the vehicle runs on a paved road and a frequency at which the detected sprung mass acceleration exceeds a dead zone is below a set value, the damping force characteristic is optimally controlled in a predetermined variable range. When the vehicle runs on a rough road and a frequency at which the detected acceleration exceeds the dead zone is above the set value, a minimum damping force limit of the predetermined variable range of the damping force characteristic is shifted toward a relatively high damping force side, The dead zone is set with an average value of the acceleration of sprung mass as a center. Hence, when the vehicle turns and zigzags, the vehicular body is inclined so that an absolute value of the sprung mass acceleration is largely changed. In this case, when an average value of the acceleration of the sprung mass is accordingly changed and the dead zone is accordingly shifted. Thus, the frequency at which the sprung mass acceleration exceeds the dead zone accurately corresponds to a situation on a road surface and the damping force characteristic is accurately controlled according to the road surface condition.

12 Claims, 5 Drawing Sheets

5,377,107

SYSTEM AND METHOD FOR CONTROLLING DAMPING FORCE CHARACTERISTIC OF SHOCK ABSORBER APPLICABLE TO AUTOMOTIVE SUSPENSION

BACKGROUND OF THE INVENTION (1) Field of the invention

The present invention relates to a system and method for controlling a damping force characteristic of a shock absorber (hereinafter referred to as a damper) installed between an unsprung mass and a sprung mass of an automotive vehicle and particularly relates to the controlling system and method with a countermeasure against noise signals.

(2) Description of the Background Art

Japanese Patent Application First (unexamined) Publication No. Showa 61-163011 exemplifies a previously proposed damping force controlling system with the countermeasure against noise signals.

The disclosed previously proposed damping force controlling system generally includes: damping force detecting means for detecting a damping force of the vehicular damper; relative displacement calculating means for calculating a relative displacement between a vehicular body and tire wheel from a detected damping force; road running state determining means for determining a state of the road on which the vehicle runs according to a period of the relative displacement which is larger than a predetermined displacement from the calculated relative displacement; and damping force switching means for switching the damping force of the damper in response to a signal derived from the road state determining means.

That is to say, the damping force of the vehicular damper is detected by the damping force detecting means and the relative displacement between the vehicular body and tire wheel is estimated by the relative displacement calculating means.

Then, a controller determines whether the road condition is paved or rough according to a period during which a larger displacement occurs than a predetermined displacement from the estimated relative displacement and a damping force of the damper is switched by means of the damping force switching means. Thereby, the road surface condition such as paved road, rough road, and projection is determined so that an appropriate damping force control according to a road surface condition can be carried out.

However, in such a previously proposed damping force controlling system as described above, the determination of the road surface condition such as paved road, rough road, and projection is carried out by the comparison of the relative displacement between a tire wheel and vehicular body with a stationary predetermined reference quantity so that a condition in which the calculated displacement exceeds the reference quantity is maintained when the vehicle turns or zigzags.

Therefore, the appropriate damping force control according to the running road surface condition is not carried out so that a vehicular comfort and steering stability are reduced.

SUMMARY OF THE INVENTION

It is, therefore, an object of the present invention to provide a damping force controlling system and method which can carry out an appropriate damping force control even when the vehicle turns and/or zigzags, thus ensuring a vehicular comfort and steering stability.

The above-described object can be achieved by providing a damping force controlling system for a damper of a vehicular suspension, comprising: a) damping force changing means responsive to an input control signal for changing the damping force characteristic of the damper at a plurality of stages; b) unsprung acceleration detecting means for detecting an acceleration of the vehicular body; c) controlling means for receiving a detected acceleration signal from the sprung acceleration detecting means and outputting the control signal to said damping force changing means so that the damping force characteristic of the damper changed by the damping force changing means is optimally controlled over a predetermined variable range; d) average value calculating means for calculating an average value of the acceleration of the sprung mass derived from the sprung mass acceleration detecting means; and, e) variable range correcting means for setting a dead zone of a predetermined width with the average value of the acceleration of the sprung mass as a center of the dead zone and for shifting a minimum damping force position in the predetermined variable range of the damping force characteristic controlled by said controlling means toward a relatively high damping force side when a frequency at which the detected sprung mass acceleration exceeds the dead zone is above a set value.

The above-described object can also be achieved by providing a method for controlling a damping force of a vehicular damper having damping force changing means responsive to an input control signal for changing the damping force characteristic of the damper at a plurality of stages, comprising the steps of: a) detecting an acceleration of sprung mass of a vehicular body; b) receiving a detected acceleration signal and outputting the control signal so that the damping force characteristic of the damper is optimally controlled over a predetermined variable range; c) calculating an average value of the acceleration derived in the step a); and, d) setting a dead zone of a predetermined width with the calculated average value of the acceleration as a center of the dead zone and shifting a minimum damping force position in the predetermined variable range of the damping force characteristic toward a relatively high damping force side when a frequency at which the detected sprung mass acceleration exceeds the dead zone is above a set value.

DETAILED DESCRIPTION OF THE PREFERRED EMBODIMENT

Reference will hereinafter be made to the drawings in order to facilitate a better understanding of the present invention.

Figure 1:
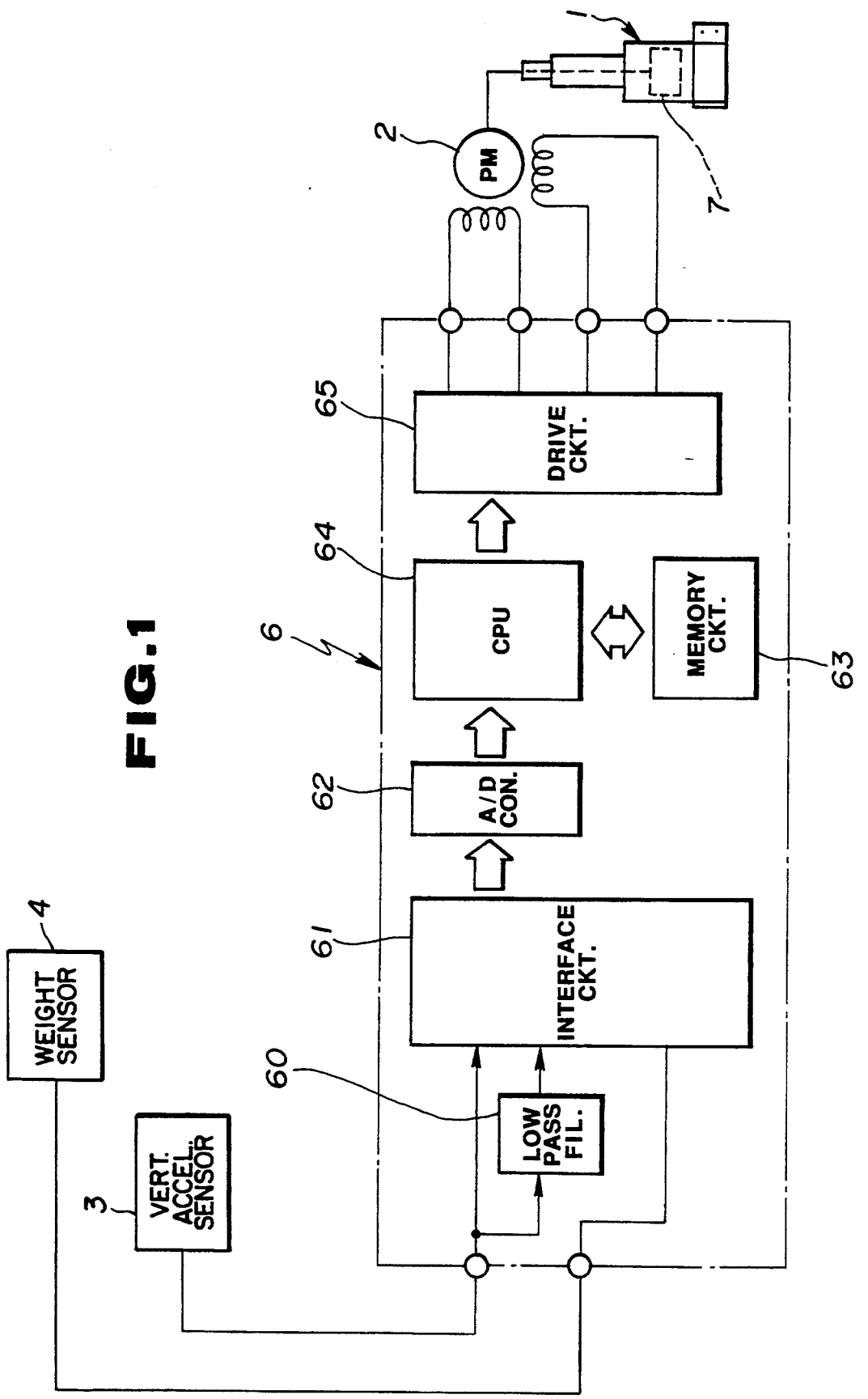
FIG. 1 is a circuit block diagram of a damping force controlling system in a preferred embodiment according to the present invention.

FIG. 1 shows a damping force controlling system in a preferred embodiment according to the present invention.

It is noted that a damper denoted by 1 is a damping force variable type damper and its damping force characteristic can be varied in three stages of damping positions in the preferred embodiment.

The structure of the damper 1 is exemplified by a U.S. Pat. No. 4,961,483, (the disclosure of which is herein incorporated by reference).

It is also noted that the damper 1 shown in FIG. 1 is disclosed by a Japanese Patent Application First Publication No. Heisei 3-84237 in which the damping force can be varied at unlimited stages.

The damper 1 includes a piston rod and damping force adjusting means (mechanism) 7 having a hydraulic flow adjuster installed in the piston rod. The damping force adjusting means 7 is rotated so that a damping force range in an expansion stroke and in a compression stroke can be varied at three stages from a soft position to a hard position.

Figure 4:
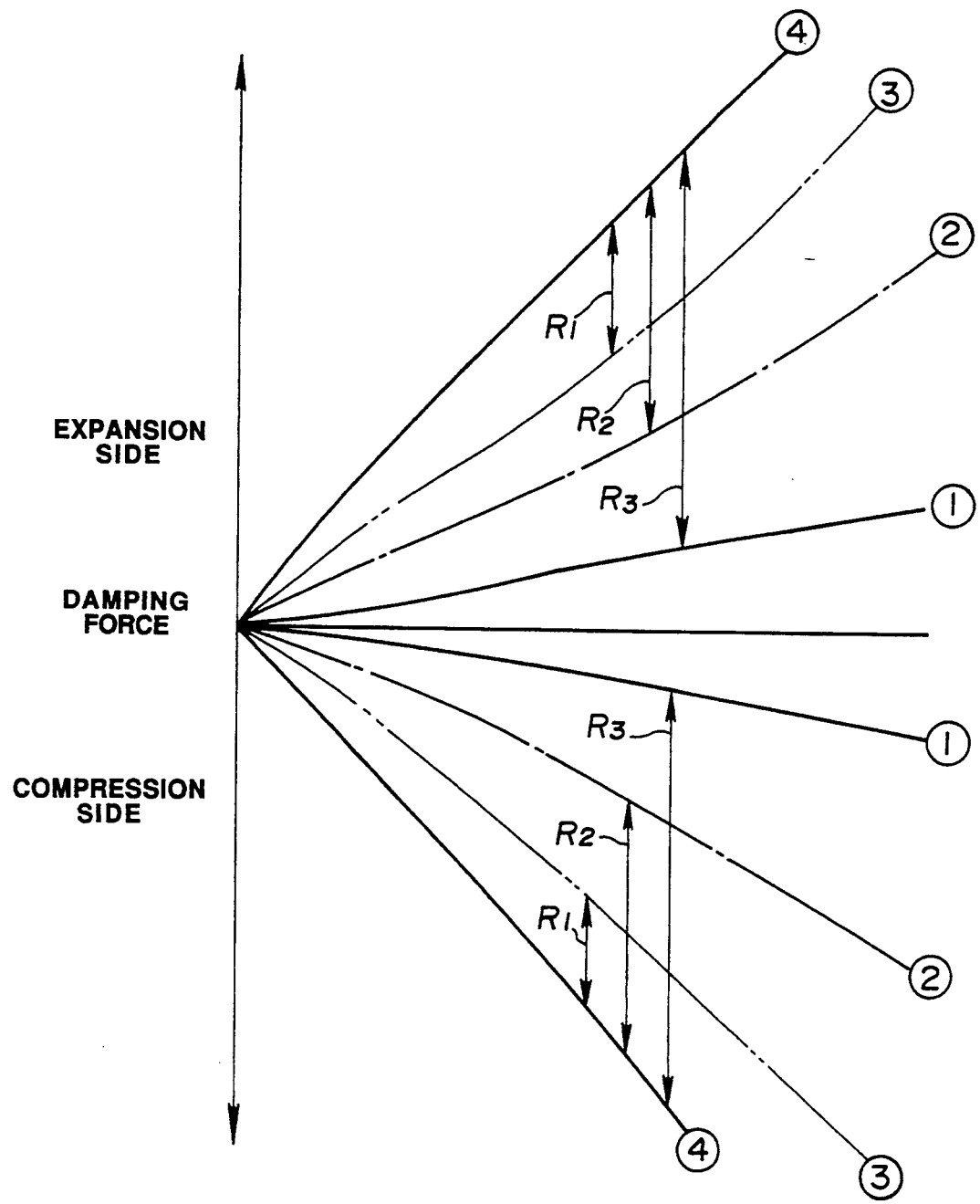
FIG. 4 is a characteristic graph of the damping force achieved by the damping force controlling system in the preferred embodiment according to the present invention.

A pulse motor 2 drives the damping force adjusting means 7 of the damper 1 to vary the position of the damping force adjusting means 7 at multiple number of stages (in the preferred embodiment, three), thus the damping force adjusting means 7 changing the damping force range in any one of the multiple number of stages from a minimum damping force range ① to a maximum damping force ④ as shown in FIG. 4.

It is noted that numerals ② and ③ denote soft side intermediate range and hard side intermediate range to divide both maximum and minimum damping force ranges into three ranges as appreciated from FIG. 4.

A vertical acceleration sensor 3 detects an acceleration in a vertical direction of a sprung mass, i.e., a vehicle body and outputs an electric signal according to a magnitude of the vertical acceleration. In addition, the detected acceleration is integrated to provide a speed signal and, therefore, the vertical acceleration sensor 3 serves as means for detecting the speed of the sprung mass.

A weight sensor 4 is installed as relative velocity detecting means which detects a relative velocity between the unsprung mass and sprung mass, i.e., expansion side speed of the damper 1 and is installed on a vehicular mount portion of the damper 1, for example, for detecting an input weight applied from the damper 1 to the vehicle body and outputting an electrical signal according to its weight.

A controller (control unit) 6 outputs a drive signal to the pulse motor 2 on the basis of the input signal derived from the vertical acceleration sensor 3 and weight sensor 4 so that the damper 1 exhibits an optimum damping force characteristic.

That is to say, the controller 6 includes: a low pass filter 60 which eliminates a high frequency component of the acceleration signal of the sprung mass derived by the vertical acceleration sensor 3; an interface circuit 61 which inputs a signal derived from the vertical acceleration sensor 3 and weight sensor 4, an A/D converter 62 which converts an input analog signal into a corresponding digital signal, and CPU 64 which executes controls of searching, retrieving, determination, and arithmetic operation on the basis of the input signals and data maps DM (refer to FIG. 3) stored in a memory circuit 63. A drive circuit 65 which outputs the drive signal to the pulse motor 2 on the basis of a result of control executed by the CPU 64.

Figure 2:
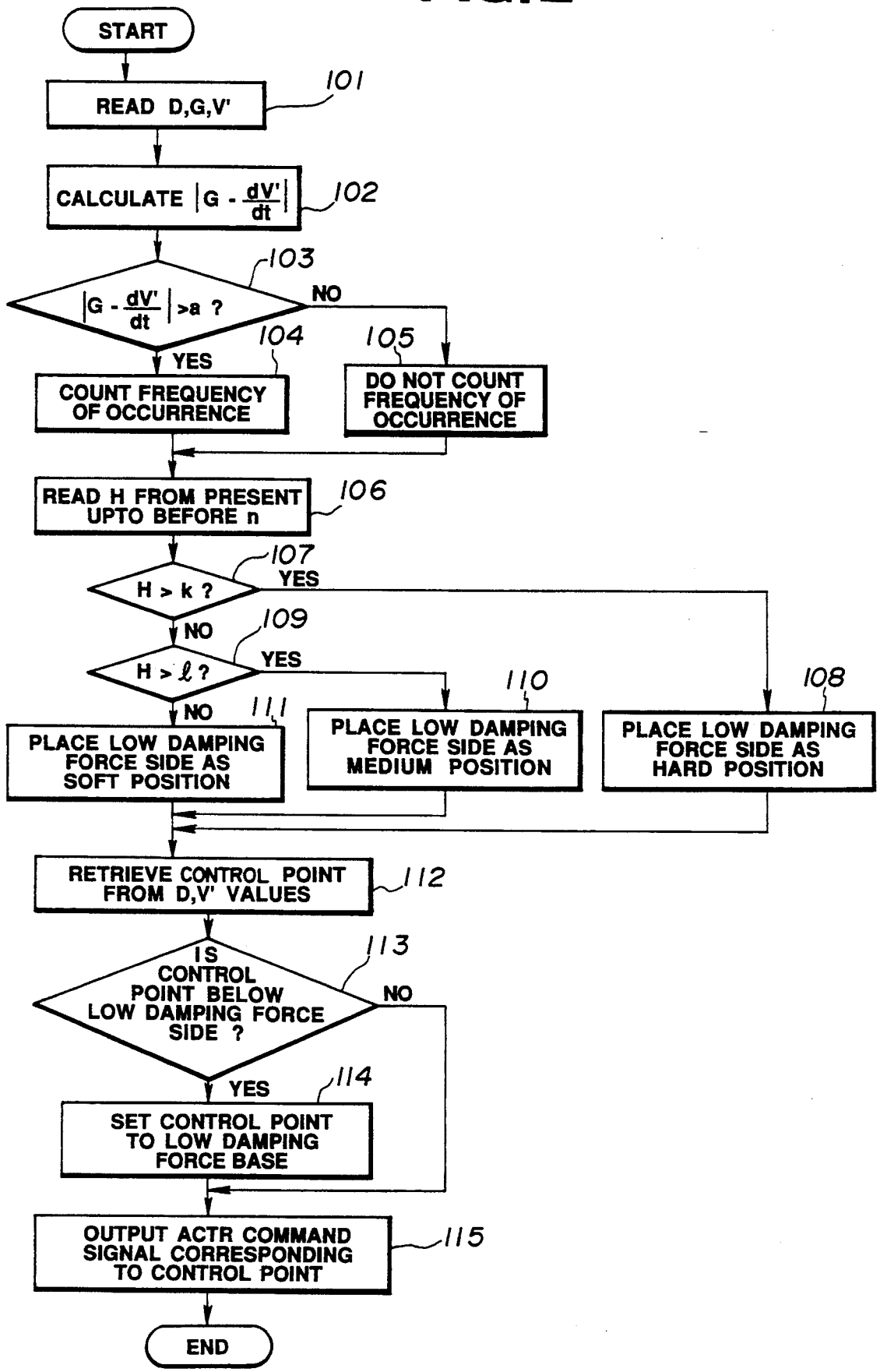
FIG. 2 is a general control flowchart executed by a controller shown in FIG. 1.

The contents of control executed by the controller 6 will be described with reference to FIG. 2.

First, in a step 101, the CPU 64 reads a weight value D derived from the weight sensor 4, an acceleration value G derived from the vertical acceleration sensor 3, and an approximation speed value V' derived from the vertical acceleration sensor 3.

It is noted that the approximation speed value V' is a value derived by eliminating the high frequency component of the signal input from the acceleration sensor 3 to obtain a substantially average value of the acceleration, and, thereafter, by integrating the substantially average value.

Figure 6:
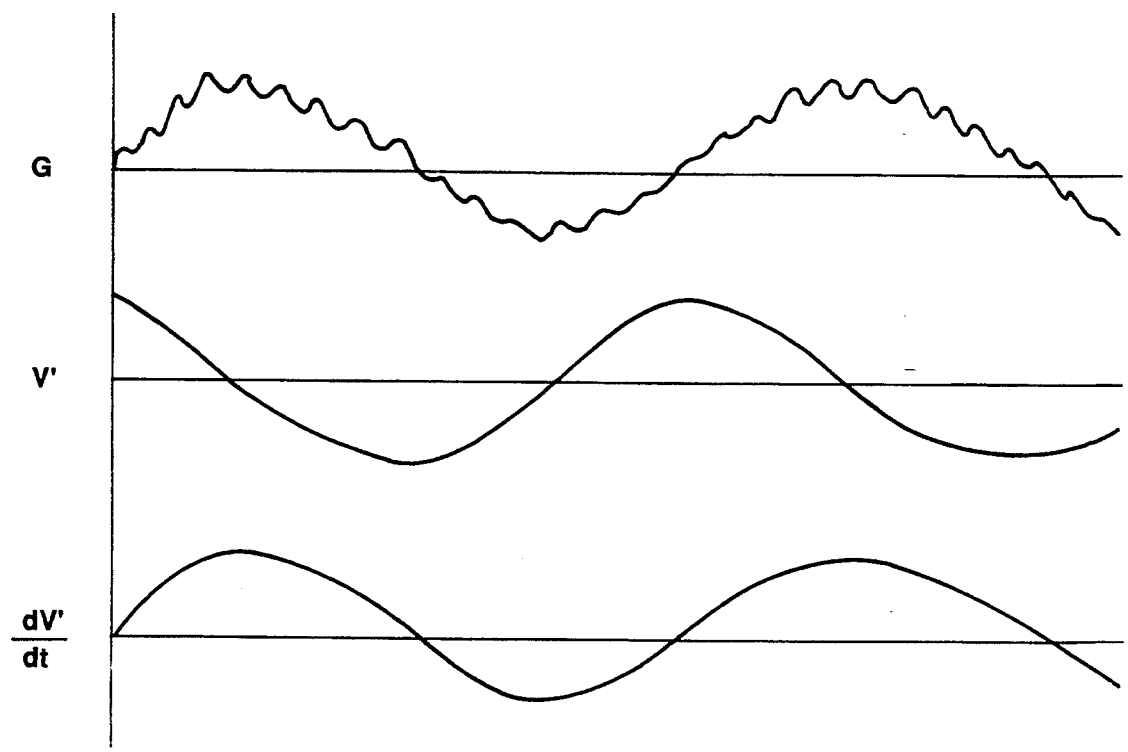
FIG. 6 is individual timing charts of variations in an acceleration G during the vehicular run, approximate speed value V', and differential value of the approximate speed value V' for explaining an operation of the damping force controlling system in the preferred embodiment.
Figure 7:
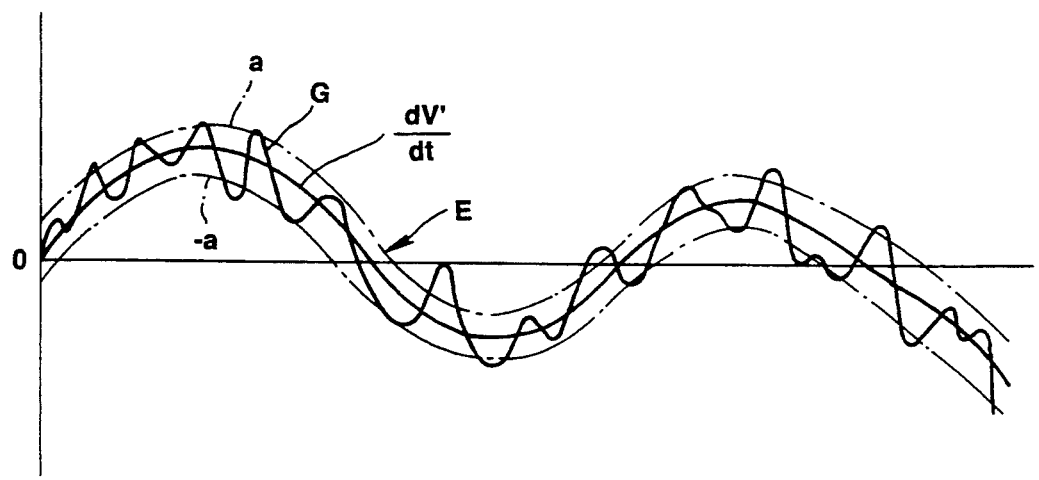
FIG. 7 is a timing chart of superposition on the variation of the acceleration G during the vehicular run and on variation of the differential value of the approximation speed value for explaining an operation of the damping force controlling system in the preferred embodiment.

That is to say, a waveform and period of an acceleration value G shown in FIG. 6 is processed in the form of the approximation speed value V' shown in FIG. 7.

Next, in a step 102, the controller 64 calculates $$|G - dV'/dt|$$

That is to say, when the approximation speed value V' is differentiated to derive an approximation average value (dV'/dt) of the acceleration and the approximation average value of the acceleration is compared with the acceleration value G detected by the acceleration sensor 3 to derive a difference therebetween.

That is to say, as shown in FIG. 6, the approximation average value (dV'/dt) is the shaped waveform in which the high frequency component is eliminated from the acceleration value G.

In a step 103, the controller 6 determines whether an absolute value of the difference derived in the step 102 exceeds a set value a. If YES in the step 103, the routine goes to a step 104 in which a frequency of occurrence H exceeding the set value a is counted. If NO in the step 103, the routine goes to a step 105 in which the frequency of occurrence is not counted.

That is to say, the controller 6, in the steps 103, 104, and 105, determines whether the detected acceleration value G exceeds a dead zone E (=dV'/dt±a) shown in FIG. 7 and the number of times (frequency of occurrence H exceeding the set value a) H is counted.

In the subsequent step 107, the controller 6 determines whether the number of times H is higher than a set high frequency k. If YES in the step 107, the routine goes to a step 108. If NO in the step 107, the routine goes to a step 109.

In the step 109, the controller 6 determines whether the frequency of occurrences H is greater than a set intermediate frequency of occurrences ι. If YES in the step 109, the routine goes to a step 110. If NO in the step 109, the routine goes to a step 111.

The steps 108, 110, 111 serve to see a variable region of the damping force range. In a step 108, the minimum damping force in the variable region (hereinafter, called a low damping force side base) is set at the hard intermediate range ③ so that the variable region is set in a range of $R_1$ shown in FIG. 4.

In a step 110, the low damping side base is set to the soft side intermediate range ② so that the low damping side base is set at the soft side intermediate range ② and the variable region is set in a range of $R_2$ shown in FIG. 4.

In a step 111, the low damping side base is set at the minimum damping range ① so that the variable range is set in the range of $R_3$ shown in FIG. 4.

In a step 112, a control point of the pulse motor 2 is retrieved from the data maps DM according to the weight value D and approximation speed value V'.

Figure 3:
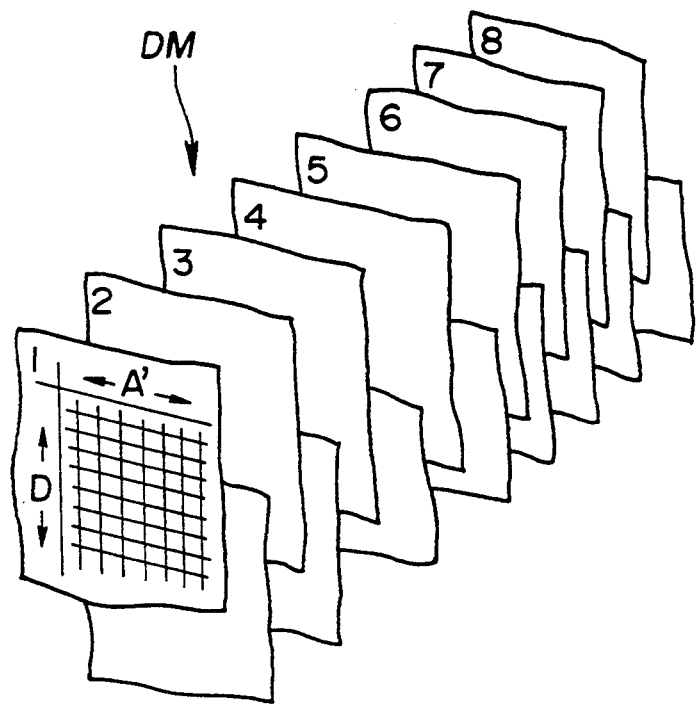
FIG. 3 is a conceptual view of a data map stored in a memory circuit of the controller shown in FIG. 1.

That is to say, the memory circuit 63 stores the data maps DM as shown in FIG. 3. The data maps DM indicate the approximation speed value V' at upper column, the weight value D detected by the weight sensor 4 at the left column, and the control point which provides an optimum damping force range corresponding to the approximation speed value V' and weight value D at each intersection between the upper column and left column.

It is noted that the data maps DM are constituted by the plural number of pages corresponding to the number of switched stages of the damper force adjusting means 7.

The data maps DM corresponding to the instantaneous control range are referred to control the damping force.

It is noted that the optimum damping force range corresponding to the approximation speed value V' and weight value D indicated in each intersection of the data maps DM is such as to control the damping force toward the high damping force side when the speed direction of the approximation speed value V' coincides with the direction of expansion and contraction of the damper indicated by the weight value D and to control the damping force toward the low damping side when they do not coincide with each other.

In the subsequent step 113, the controller 6 determines whether the control point retrieved in the step 112 falls below the damping range of the low damping side base. If YES in the step 113, the routine goes to a step 114 in which the control point is set at the damping range of the low damping side base. If NO in the step 114, the routine goes directly to the step 115.

In the step 115, a command signal is output to the pulse motor 2 so as to provide the damping force range corresponding to the control point.

As described above, one operational flow is ended and the above flow is repeated in the controller 6.

Next, an operation as the result of the control by the damping force controlling system in the preferred embodiment will be described below:

(A) Paved road running situation

It is noted that the vertical acceleration sensor 3 is called a vertical accelerometer and the weight sensor 4 is also called a load sensor.

The structure of the controller 6 including such sensors as described above is exemplified by a U.S. patent application No. 07/682,593 filed on Apr. 8, 1991, (the disclosure of which is herein incorporated by reference).

When the vehicle runs on the paved road, the input from the tire wheel side to the vehicular body is so small that the number of times H the acceleration value G exceeds the dead zone range E is below the set high frequency k and the set medium frequency $\iota$.

Hence, since the low damping force side base is set on the minimum damping force range ① (shown in FIG. 4), the damping force characteristic is optimally controlled over a range of the maximum variable region $R_3$.

(B) Rough Road Running situation

On the other hand, when the vehicle runs on the rough road, the input from the tire wheel side to the vehicular body becomes so large that the number of times H the acceleration value G exceeds the dead zone E.

In this case, when the number of times H exceeds the set medium frequency $\iota$ but below the set high frequency k, the low damping force side base is set on the soft side intermediate range ② and the damping force control is carried out in the variable region of $R_2$ shown in FIG. 4.

In a case where the number of times H exceeds the set high frequency k, the damping force control is carried out in the variable range of $R_1$ shown in FIG. 4.

In the way described above, when the vehicle runs on the rough road, the damping force control cannot be carried out toward the low damping force side so that a gripping force of the tire wheels and steering stability can be secured.

(C) Turns and Zigzagged Running Situation

When the vehicle turns and zigzags, the posture change occurs in the vehicular body.

In this case, as the vehicular posture change occurs, the acceleration value G becomes large. In other words, the detected acceleration value G includes a component of the acceleration due to the change in posture and a component of the acceleration due to input from the road surface.

In this way, in a case where the acceleration value G due to the change in posture is largely changed due to the change in posture, its average value is changed by a component of the change in posture. Consequently, as shown in FIG. 6, (dV'/dt), i.e., its approximated average value is changed and the dead zone E is correspondingly changed.

Since, in the same way as the vehicle runs straight, the input from the tire wheels, i.e., the road surface condition can be determined according to the frequency H exceeding the dead zone E of the acceleration value G. Thereby, the damping force can accurately be controlled according to the road surface condition without influence from the vehicular change in posture and the accurate control according to the road surface condition even in a case when the vehicle turns or zigzags.

In the preferred embodiment, the optimum damping force is set by looking upto the data map DM stored in the memory circuit 63 without calculation based on the input signal. Since the structure of the controller 6 can be simplified and the reduction of cost can be achieved. Simultaneously, the responsive characteristic of control can be improved due to the mere retrieval of the data map DM.

Although in the preferred embodiment the damping force control is carried out on the basis of the data map retrieval, such an alternative as described below can be applied to the damping force control.

Figure 5:
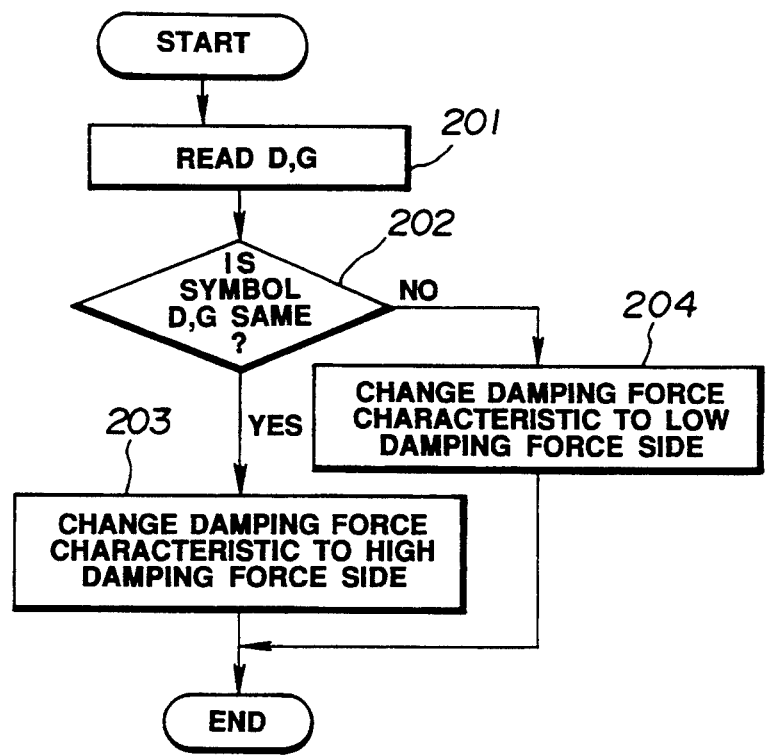
FIG. 5 is another control flowchart executed by the controller shown in FIG. 1.

That is to say, as shown in an operational flowchart of FIG. 5, the controller 6 reads the weight value D derived from the weight sensor 4 and the acceleration value G derived from the vertical acceleration sensor 3 in a step 201, compares their signs (+ or −) with each other in a step 202, and carries out the damping force control on the basis of the result of comparison in steps 203 and 204.

It is noted that the limit values of the dead zone and set value of the frequency H exceeding the dead zone need not be fixed and may be shifted (varied) according to a magnitude of vehicle speed and steering angle and according to operations of a vehicular accelerator or brakes.

As described hereinabove, in the damping force controlling system and method according to the present invention, sprung mass acceleration detecting means for detecting an acceleration of the sprung mass of the vehicle body as the vehicular behavior detecting means is installed.

Furthermore, in the controller of the damping force controlling system and method, the average value calculating block which derives the average value of the sprung mass acceleration derived from the sprung mass acceleration means, the average value calculating block which derives the average value of the sprung mass acceleration derived from the sprung mass acceleration detecting means and the dead zone of the predetermined width with the average value of the sprung mass acceleration derived from the sprung mass average value as the center is set. When the frequency exceeding the detected sprung acceleration is above the set value, a variable range correcting block is provided in which the minimum damping force from among the variable ranges of the damping force characteristic controlled by the controller is shifted toward the higher damping force side. Therefore, the control corresponding to the road surface condition can be carried out without influence of vehicular body gradient during the vehicle turn and vehicle zigzag on the basis of the shift of the dead zone corresponding to the vehicular body gradient. Thus, the vehicular comfort and steering stability can be secured. Particularly, the gripping force of the vehicle during the turn and zigzag of the vehicle and when the vehicle runs on the rough road can be secured and the steering stability can be improved.

It will fully be appreciated by those skilled in the art that the foregoing description has been made to the preferred embodiment and various changes and modifications may be made without departing from the scope of the present invention which is to be defined by the appended claims.

What is claimed is:

1. A damping force controlling system for a damper of a vehicular suspension, comprising:

a) damping force changing means responsive to an input control signal for changing a damping force characteristic of the damper at a plurality of stages;

b) sprung mass acceleration detecting means for detecting an acceleration of a vehicular body;

c) controlling means for receiving a detected acceleration signal from the sprung mass acceleration detecting means and outputting the control signal to said damping force changing means so that the damping force characteristic of the damper changed by the damping force changing means is optimally controlled over a predetermined variable range;

d) average value calculating means for calculating an average value of the acceleration of the sprung mass derived from the sprung mass acceleration detecting means; and, e) variable range correcting means for setting a dead zone of a predetermined width with the average value of the acceleration of the sprung mass as a center of the dead zone and for shifting a minimum damping force position in the predetermined variable range of the damping force characteristic controlled by said controlling means toward a relatively high damping force side when a frequency at which the detected sprung mass acceleration exceeds the dead zone is above a set value.

2. A damping force controlling system for a damper of a vehicular suspension as set forth in claim 1, which further includes expansion and constriction speed detecting means for detecting a displacement speed of the damper and wherein said controlling means compares a direction of a speed of the sprung mass detected from the sprung mass acceleration detecting means with a direction of displacement of the damper detected by the displacement speed detecting means and outputs the control signal to the damping force changing means so that the damping force characteristic is changed toward a relatively high damping force side when both of said speed directions coincide with each other and the damping force characteristic is changed toward a relatively low damping force side when they do not coincide with each other.

3. A damping force controlling system for a damper of a vehicular suspension as set forth in claim 2, wherein said average value calculating means includes a low pass filter provided for eliminating high frequency components exceeding a predetermined low frequency from the sprung mass acceleration signal derived from the sprung mass acceleration detecting means and integrating the sprung mass acceleration signal passing therethrough and a differential calculating block for differentiating the integrated value of the sprung mass acceleration signal.

4. A damping force controlling system for a damper of a vehicular suspension as set forth in claim 3, wherein said damping force changing means changes the damping force characteristic at three stages and said controlling means outputs the control signal to said damping force changing means so that said damping force changing means changes a damping force range at three predetermined variable ranges from a minimum damping force limit to a maximum damping force limit.

5. A damping force controlling system for a damper of a vehicular suspension as set forth in claim 4, wherein said expansion and constriction speed detecting means includes a weight sensor which outputs a weight value to said controlling means and wherein said controlling means comprises a controller having said average value calculating means and variable range correcting means.

6. A damping force controlling system for a damper of a vehicular suspension as set forth in claim 5, wherein said controller reads the weight value (D) derived from said weight sensor, the acceleration value (G) derived from the acceleration sensor, and an approximated speed value (V') derived from the low-pass filter.

7. A damping force controlling system for a damper of a vehicular suspension as set forth in claim 5, wherein said controller reads the weight value (D) and acceleration value (G), determines whether signs of D and G are mutually the same, and outputs the control signal to the damping force changing means so that the damping force characteristic is changed to either a relatively high damping force side or relatively low damping force side according to a result of determination of the signs.

8. A damping force controlling system for a damper of a vehicular suspension as set forth in claim 6, wherein said controller calculates the following : $|G-dV'/dt|$; determines whether $|G-dV'/dt|$ exceeds set value (a); counts the frequency H at which $|G-dV'/dt|$ exceeds the set value (a); determines whether the counted frequency (H) exceeds a set high frequency (k); and determines whether the counted frequency exceeds a set medium frequency ($\iota$).

9. A damping force controlling system for a damper of a vehicular suspension as set forth in claim 8, wherein said controller outputs the control signal to said damping force changing means so that the minimum damping force limit is set in a hard medium intermediate limit and the predetermined variable range is set in $R_1$ when $H>\iota$, and said controller outputs the control signal to said damping force changing means so that the minimum damping force is set in a lowest damping range limit and the predetermined variable range is set in $R_3$ when $H \leq k$ and $H \leq \iota$.

10. A damping force controlling system as set forth in claim 9, wherein said damping force changing means includes a pulse motor which receives the control signal to said controller and outputs a drive signal to said damper according to the control signal.

11. A method for controlling a damping force of a damper for a vehicular suspension having damping force changing means responsive to an input control signal for changing a damping force characteristic of the damper at a plurality of stages, comprising the steps of:
    a) detecting an acceleration of an sprung mass of a vehicular body;
    b) receiving a detected acceleration signal and outputting the control signal so that the damping force characteristic of the damper is optimally controlled over a predetermined variable range;
    c) calculating an average value of the acceleration derived in the step a); and,
    d) setting a dead zone of a predetermined width with the calculated average value of the acceleration as a center of the dead zone and shifting a minimum damping force position in the predetermined variable range of the damping force characteristic toward a relatively high damping force side when a frequency at which the detected sprung mass acceleration exceeds the dead zone is above a set value.

12. A damping force controlling system for a damper of a vehicle suspension comprising:
    a) damping force changing means responsive to an input control signal for changing a damping force characteristics of the damper at a plurality of stages;
    b) sprung mass acceleration detecting means for detecting an acceleration of a vehicle body;
    c) controlling means for receiving a detected acceleration signal from the sprung mass acceleration detecting means and outputting the control signal to said damping force changing means so that the damping force characteristics of the damper changed by the damping force changing means is optimally controlled over a predetermined range;
    d) average value calculating means for calculating an average value of the acceleration of the sprung mass derived from the sprung mass acceleration detecting means; and
    e) variable range correcting means for setting a dead zone of a predetermined width with the average value of the acceleration of the sprint mass as a center of the dead zone and for shifting a minimum damping force position in the predetermined variable range of the damping force characteristic controlled by said controlling means toward a relatively high damping force side when a frequency at which the detected spring mass acceleration exceeds the dead zone, is above a plurality of predetermined frequency integer valves k and $\iota$.

* * * * *